No. 663,112. Patented Dec. 4, 1900.
J. J. BERRIGAN.
CENTRIFUGAL CREAM SEPARATOR.
(Application filed May 24, 1900.)
(No Model.)
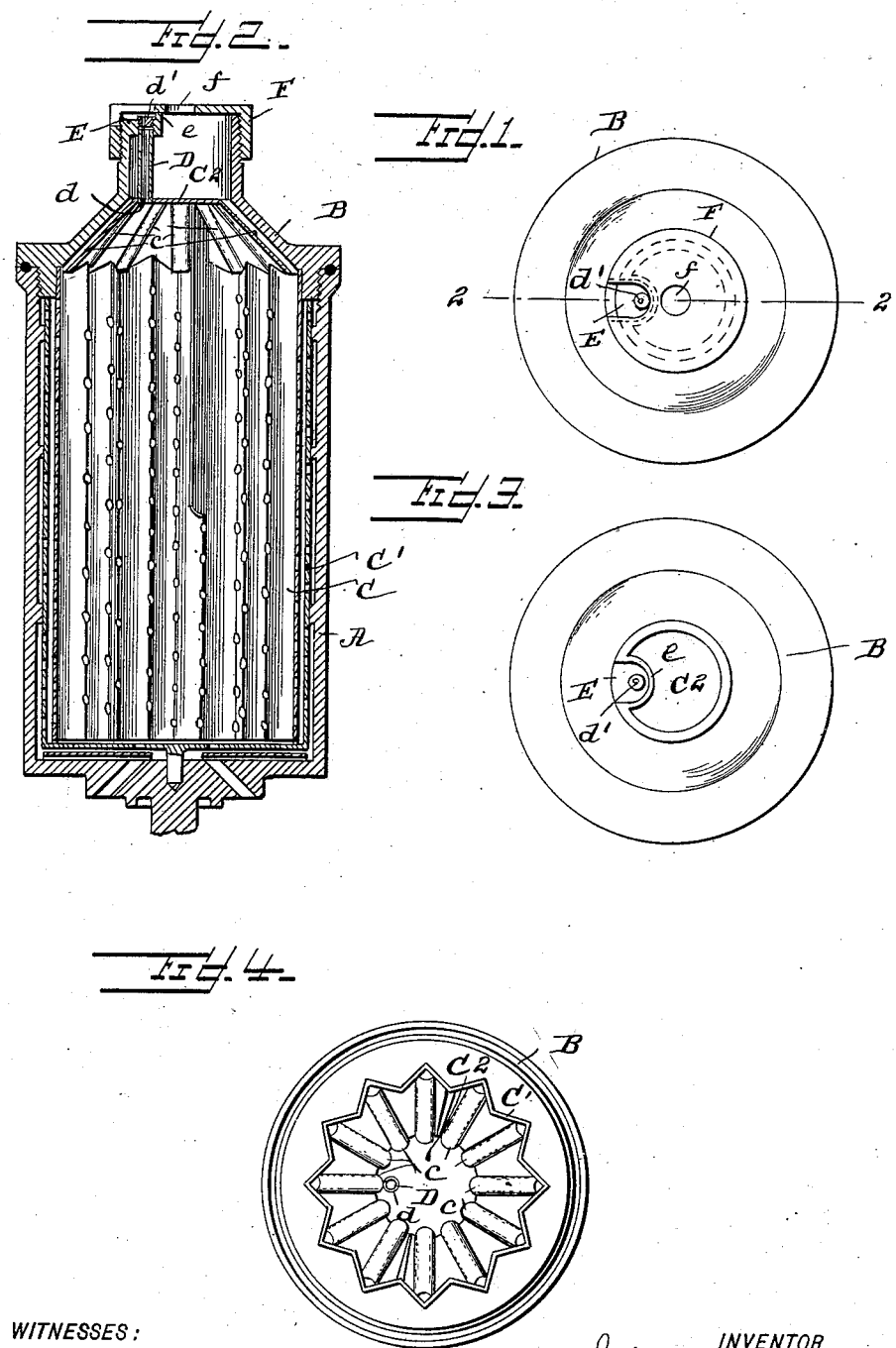
WITNESSES:
INVENTOR

UNITED STATES PATENT OFFICE.

JOHN JOSEPH BERRIGAN, OF AVON, NEW YORK, ASSIGNOR TO THE DE LAVAL SEPARATOR COMPANY, OF NEW JERSEY.

CENTRIFUGAL CREAM-SEPARATOR.

SPECIFICATION forming part of Letters Patent No. 663,112, dated December 4, 1900.

Application filed May 24, 1900. Serial No. 17,779. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Cream-Separators, of which the following is a full, clear, and exact description, reference being had to the accompanying drawings, which form a part of this specification.

My invention relates to an improvement in a certain class of cream-separators, and has for its object to enable all parts of such machines to be more readily and thoroughly cleaned.

My improvement relates to that class of separators in which the interior of the bowl is provided with an angular or polygonal partition secured to the neck of the bowl and in which a corrugated inclined plate is placed within said polygonal partition and also secured to the neck of the bowl. The full milk is discharged onto the top of this inclined plate and escapes in corrugations between the edge of the inclined plate and the polygonal partition. The plate has an orifice in the cream zone of the bowl ending at its upper surface in a pipe leading to the cream-outlet orifice in the upper surface of the neck of the bowl. As this disk is close to the neck of the bowl, it is difficult to clean the corrugations from below. Also it is impossible to get at the upper surface of this plate, as in this character of machines the cream-orifice is in the cap or cover of the top of the neck of the bowl and the annular orifice in said cap or cover for the delivery of the full milk is too small to allow for the insertion of cleaning devices. Thus it has been difficult to operate this machine for any length of time successfully.

I will now describe the embodiment of my invention illustrated in the drawings, whereby I am enabled to so change the construction of the bowl as to enable the corrugations on the upper surface of the plate to be readily cleaned.

Figure 1 is a plan view of the bowl. Fig. 2 is a section on the line 2 2 of Fig. 1. Fig. 3 is a plan view of the bowl with the screw-cap removed. Fig. 4 is an inverted plan of the cover of the bowl and its appurtenances.

A is the bowl proper.

B is the cover or neck. Within the bowl are the polygonal partitions C C', partition C being loose within the bowl and partition C' being within the polygonal partition C and secured to the neck of the bowl. These partitions C and C' are perforated, as shown. Within the polygonal partition C' is a conical disk $C^2$, corrugated as shown at c. This disk is secured to the neck of the bowl, and its outer edges are connected to corrugations in the partition C', so that a space is left between the outer edge of the disk $C^2$ and the partition C'. There is also a space between the top of this disk $C^2$ and the top of the neck of the bowl. There is also an orifice d in the disk $C^2$, connected with a pipe D, which extends through the space between the disk and the neck of the bowl and through the upper surface of the neck of the bowl into the cream-discharge outlet d'.

In the operation of this device the full milk is fed through the orifice in the top of the bowl, falling into the chamber between the disk $C^2$ and the top of the bowl and being carried along the corrugations in the conical disk and discharged into the bowl at the inner edge of the polygonal partition C' at a considerable distance from the center. In order to enable these corrugations and the upper surface of the disk $C^2$ to be readily cleaned, I have made the following construction: I form the neck of the bowl at the point of cream-outlet and where the pipe d extends thereto in the form of a ledge or shelf, as shown at E in Figs. 2 and 3. Surrounding this shelf and connecting with the neck of the bowl is a flanged portion e, the top of the flange being flush with the top of the neck of the bowl. The exterior of the neck of the bowl B is screw-threaded. The size of the orifice beyond the flange is sufficient to enable the insertion of a cleaning device within the bowl and upon the upper surface of the disk $C^2$.

F is a cap which is adapted to cover the top of the neck of the bowl and leave the orifice f, through which the full milk may be fed, open into the bowl. This cap F has a cut-away portion f' corresponding to the portion E, in which the cream-discharge orifice is placed. This cap is threaded and is adapted to mesh with the thread upon the neck of the bowl.

The practical operation of this device is as follows: When it is desired to clean the bowl, the cap F is removed, which leaves the neck of the bowl open to such an extent as to enable the disk readily to be cleaned. When the cap is replaced in position, the top of the neck of the bowl is covered, leaving only the proper orifice, through which the new milk may be fed into the bowl.

Having now fully described my invention, what I claim, and desire to protect by Letters Patent, is—

1. In a centrifugal cream-separator of the character described, a bowl provided with an open-mouthed neck, the recessed portion below the top of the neck adapted to receive the cream-outlet and provided with a flanged portion upwardly extending therefrom and flush with the top of the neck of the bowl.

2. In a centrifugal cream-separator of the character described, a bowl provided with an open-mouthed neck and with an inwardly-projecting portion below the neck of the bowl adapted to receive the cream-outlet and an upwardly-extending flanged portion extending therefrom and around the upper surface of the neck of the bowl, and a cap provided with a central orifice and a cut-away portion corresponding with the inwardly-projecting portion on the upper surface of the neck of the bowl.

3. In a centrifugal cream-separator of the character described, a bowl provided with the open-mouthed portion with an inwardly-projecting portion below the top of the neck adapted to receive the cream-outlet, and upwardly-extending flange portion extending therefrom and around the upper surface of the neck of the bowl, the neck of the bowl being threaded, and a cap provided with a central orifice and a cut-away portion corresponding with the inwardly-projecting portion on the upper surface of the neck of the bowl, said cap being threaded and adapted to mesh with threads on the neck of the bowl.

In testimony of which invention I have hereunto set my hand at New York, N. Y., on this 5th day of May, 1900.

JOHN JOSEPH BERRIGAN.

Witnesses:
JOHN S. PAUL,
M. F. ELLIS.